US012590178B2

(12) United States Patent
Endo et al.

(10) Patent No.: US 12,590,178 B2
(45) Date of Patent: Mar. 31, 2026

(54) CURABLE RESIN COMPOSITION AND METHOD FOR SUPPRESSING CURING SHRINKAGE OF CURABLE RESIN COMPOSITION

(71) Applicant: ADEKA CORPORATION, Tokyo (JP)

(72) Inventors: Takeshi Endo, Kitakyushu (JP); Junji Ueyama, Kuki (JP); Ryo Ogawa, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 807 days.

(21) Appl. No.: 17/796,196

(22) PCT Filed: Mar. 16, 2021

(86) PCT No.: PCT/JP2021/010589
§ 371 (c)(1),
(2) Date: Jul. 28, 2022

(87) PCT Pub. No.: WO2021/193233
PCT Pub. Date: Sep. 30, 2021

(65) Prior Publication Data

US 2023/0105437 A1 Apr. 6, 2023

(30) Foreign Application Priority Data

Mar. 25, 2020 (JP) ................................ 2020-054329

(51) Int. Cl.
*C08G 59/40* (2006.01)
*C08G 59/24* (2006.01)
*C08G 59/50* (2006.01)
*C08G 59/56* (2006.01)
*C08G 59/68* (2006.01)
*C08L 63/00* (2006.01)

(52) U.S. Cl.
CPC ....... *C08G 59/245* (2013.01); *C08G 59/5033* (2013.01); *C08G 59/686* (2013.01); *C08G 59/687* (2013.01); *C08L 63/00* (2013.01)

(58) Field of Classification Search
None
See application file for complete search history.

(56) References Cited

U.S. PATENT DOCUMENTS 4,804,740 A 2/1989 Gardner et al.
9,382,459 B2 7/2016 Ogawa et al.
9,601,401 B2 3/2017 Ogawa et al.
2007/0027274 A1* 2/2007 Antelmann ........ C08G 59/4021 528/93
2011/0095453 A1 4/2011 Ogawa et al.
2013/0165600 A1 6/2013 Chen
2018/0237603 A1* 8/2018 Spencer .................. B29C 70/34
2019/0185711 A1 6/2019 Suwa et al.

FOREIGN PATENT DOCUMENTS

CN 103228696 A 7/2013
JP 54-26000 2/1979
JP 57-167370 10/1982
JP 60-250026 12/1985
JP H01158038 A 6/1989
JP H08231684 A 9/1996
JP 2001220429 A * 8/2001
JP 2001-302767 10/2001
JP 2002037983 A 2/2002
JP 2004-238555 8/2004
JP 2006-307141 11/2006
JP 2007-504341 3/2007
JP 2009-013205 1/2009
JP 2011-503315 1/2011
JP 2011-074298 4/2011
JP 2014-506621 3/2014
JP 2018009048 A * 1/2018
JP 2018080310 A 5/2018
JP 2019-156991 9/2019
WO 99/05196 2/1999
WO 2009157147 A1 12/2009

OTHER PUBLICATIONS

Machine translation of JP-2001220429-A (no date).*
Machine translation of JP-2018009048-A (no date).*
Office Action, issued in Japanese Patent Application No. 2022-50997 dated Feb. 18, 2025.
International Search Report for PCT/JP2021/010589 dated May 25, 2021, 7 pages.
Written Opinion of the ISA for PCT/JP2021/010589 dated May 25, 2021, 5 pages.

* cited by examiner

*Primary Examiner* — Michael J Feely
(74) *Attorney, Agent, or Firm* — NIXON & VANDERHYE

(57) ABSTRACT

Provided is a curable resin composition exhibiting reduced or controlled shrinkage on curing. The composition includes (A) an epoxy resin, (B) a latent curing agent, and (C) a compound represented by formula (1):

(1)

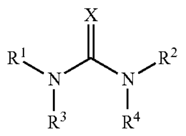

wherein X is an oxygen atom or a sulfur atom; $R^1$ and $R^2$ each independently represent a hydrogen atom, an alkyl group, or an aryl group; and $R^3$ and $R^4$ each independently represent a hydrogen atom, an alkyl group, or an aryl group, or $R^3$ and $R^4$ are connected to each other to represent a divalent group to form a ring.

13 Claims, No Drawings

CURABLE RESIN COMPOSITION AND METHOD FOR SUPPRESSING CURING SHRINKAGE OF CURABLE RESIN COMPOSITION

CROSS-REFERENCE TO RELATED APPLICATIONS

This application is the U.S. national phase of International Application No. PCT/JP2021/010589 filed Mar. 16, 2021 which designated the U.S. and claims priority to Japanese Patent Application No. 2020-054329 filed Mar. 25, 2020, the entire contents of each of which are hereby incorporated by reference.

BACKGROUND OF THE INVENTION

Field of the Invention

This invention relates to a curable resin composition, more particularly a curable resin composition containing an epoxy resin, a latent curing agent, and a specific urea compound and exhibiting reduced or controlled shrinkage on curing.

Description of the Related Art

Epoxy resins are widely used in industry in the fields such as coatings, adhesives, and various molding materials.

Use of existing epoxy resins, either alone or in combination, may be unsatisfactory in some cases, and a cyanate-epoxy composite resin composition composed of an epoxy resin and a cyanate ester resin has become frequently used as a useful material in such cases because of its high heat resistance. For example, resin compositions containing a cyanate ester resin, an epoxy resin, and a latent curing agent have been proposed in patent literatures 1 to 5 listed below.

However, curable resin compositions containing an epoxy resin and the like shrink on curing, and this shrinkage can cause problems including cracking or warpage after cure.

Various studies have been directed to the reduction of shrinkage on curing. For example, patent literatures 6 to 8 propose using a silica filler, but the effect of the addition of the silica filler is still short of satisfaction.

CITATION LIST

Patent Literature

Patent literature 1: JP 2001-302767A
Patent literature 2: JP S60-250026A
Patent literature 3: WO 99/05196
Patent literature 4: U.S. Pat. No. 9,601,401
Patent literature 5: U.S. Pat. No. 9,382,459
Patent literature 6: US 2019/0185711
Patent literature 7: JP 2006-307141A
Patent literature 8: JP 2019-156991A

SUMMARY OF INVENTION

An object of the invention is to provide a curable resin composition exhibiting reduced or controlled shrinkage on curing.

As a result of intensive investigations, the inventors have found that a curable resin composition containing an epoxy resin, a latent curing agent, and a specific urea or thiourea compound achieves the above object. The present invention has been completed based on this finding.

The invention provides a curable resin composition containing: (A) an epoxy resin, (B) a latent curing agent, and (C) a compound represented by formula (1):

[Chem. 1]

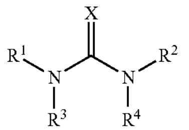

(1)

wherein X represents an oxygen atom or a sulfur atom; $R^1$ and $R^2$ each independently represent a hydrogen atom, an alkyl group, or an aryl group; and $R^3$ and $R^4$ each independently represent a hydrogen atom, an alkyl group, or an aryl group, or $R^3$ and $R^4$ are connected to each other to represent a divalent group to form a ring.

The invention also provides a cured product obtained from the curable resin composition.

The invention also provides a method for reducing or controlling shrinkage of a cured product obtained from a curable resin composition containing (A) an epoxy resin and (B) a latent curing agent. The method includes curing the resin composition in the presence of the above-described component (C).

The invention enables reduction and control of shrinkage of a curable resin composition on curing, and thus enables application of the curable resin composition to adhesives, coatings, or molded products.

DESCRIPTION OF THE PREFERRED EMBODIMENTS

The curable resin composition of the invention will now be described.

Examples of the epoxy resin used as component (A) include polyglycidyl ether compounds of mononuclear polyhydric phenol compounds, such as hydroquinone, resorcin, pyrocatechol, and phloroglucinol; polyglycidyl ether compounds of polynuclear polyhydric phenol compounds, such as dihydroxynaphthalene, biphenol, methylenebisphenol (bisphenol F), methylene bis(orthocresol), ethylidene bisphenol, isopropylidene bisphenol (bisphenol A), isopropylidene bis(orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolak, orthocresol novolak, ethylphenol novolak, butylphenol novolak, octylphenol novolak, resorcin novolak, and terpenephenol; polyglycidyl ether compounds of polyhydric alcohols, such as ethylene glycol, propylene glycol, butylene glycol, hexanediol, polyethylene glycol, polypropylene glycol, thiodiglycol, dicyclopentadiene dimethanol, 2,2-bis(4-hydroxycyclohexyl)propane (hydrogenated bisphenol A), glycerol, trimethylolpropane, pentaerythritol, sorbitol, and bisphenol A-alkylene oxide adducts; glycidyl esters of aliphatic, aromatic, or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimeric acid, pyromellitic acid, tetrahydrophthalic acid, and endomethylene tetrahydrophthalic acid; homopolymers or copolymers of glycidyl methacrylate; epoxy compounds having a glycidylamino group, such as N,N-diglycidylaniline, bis(4-(N-methyl-N-glycidylamino)phenyl)methane, diglycidyl orthotoluidine, N,N-bis(2,3-epoxypropyl)-4-(2,3-epoxypropoxy)-2-methylaniline, N,N-bis(2,3-epoxypropyl)-4-(2,3-epoxypropoxy)aniline, and N,N,N',N'-tetra(2,3-epoxypropyl)-4,4-diaminodiphenylmethane; epoxidized cyclic olefin compounds, such as vinylcyclohexene diepoxide, dicyclopentanediene diepoxide, 3,4-epoxycyclohexylmethyl-3,4-epoxycyclohexane carboxylate, 3,4-epoxy-6-methylcyclohexylmethyl-6-methylcyclohexane carboxylate, and bis(3,4-epoxy-6-methylcyclohexylmethyl) adipate; epoxidized conjugated diene polymers, such as epoxidized polybutadiene and epoxidized styrene-butadiene copolymers; and heterocyclic compounds, such as triglycidyl isocyanurate. These epoxy resins may be internally crosslinked by an isocyanate-terminated urethane prepolymer or may have their molecular weight increased by using polyhydric active hydrogen compounds, such as polyhydric phenols, polyamines, carbonyl-containing compounds, and polyphosphoric esters.

These epoxy resins may be used either individually or in combination of two or more thereof.

The curable resin composition of the invention may contain another curable resin for combination use with the epoxy resin (A). In terms of the resulting high heat resistance, it is preferable to use (D) a cyanate ester resin in addition to the epoxy resin (A).

Any cyanate ester resin having at least two cyanate groups may be used as component (D) irrespective of its molecular structure, molecular weight, and so on.

Examples of the cyanate ester resin (D) include a compound represented by formula (2) below, a compound represented by formula (3) below, and a polymer thereof. It is preferable to use at least one of them as component (D). The polymer as referred to above is exemplified by a product of self-polymerization of the cyanate ester resin and cyanate ester resins having the molecular weight increased through, for example, triazination of a plurality of the cyanate groups.

[Chem. 2]

$$NC—O\text{-}A^1\text{-}Y^1\text{-}A^2\text{-}O—CN \quad (2)$$

wherein $Y^1$ represents an unsubstituted or fluorine-substituted divalent hydrocarbon group, —O—, —S—, or a single bond; and $A^1$ and $A^2$ each independently represent an unsubstituted phenylene group or a phenylene group substituted with a C1-C4 alkyl group.

[Chem. 3]

(3)

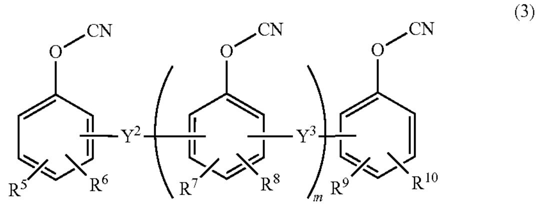

wherein m represents an integer of 1 or greater; $Y^2$ and $Y^3$ each independently represent an unsubstituted or fluorine-substituted divalent hydrocarbon group; and $R^5$, $R^6$, $R^7$, $R^8$, $R^9$, and $R^{10}$ each independently represent a hydrogen atom or a C1-C4 alkyl group.

$Y^1$ in formula (2) and $Y^2$ and $Y^3$ in formula (3) each preferably have a structure represented by any one of the following formulae (Y-1) through (Y-9):

[Chem. 4]

(Y-1)

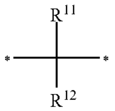

(Y-2)

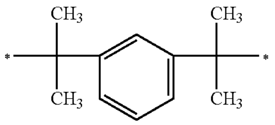

(Y-3)

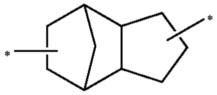

(Y-4)

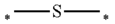

(Y-5)

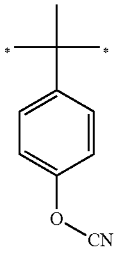

(Y-6)

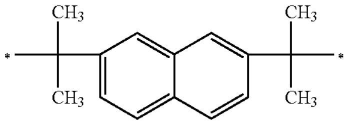

(Y-7)

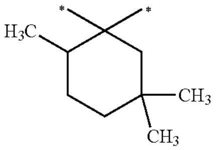

(Y-8)

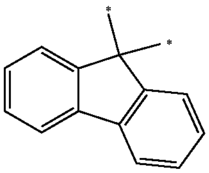

(Y-9)

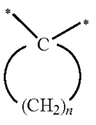

wherein n represents an integer of 4 to 12; $R^{11}$ and $R^{12}$ each independently represent a hydrogen atom or an unsubstituted or fluorine-substituted methyl group; and the asterisk * indicates a bond.

Of the cyanate ester resins described, preferred are those of formula (2) in terms of the balance between curing properties and the effect on reduction and control of shrinkage on curing.

With a view to obtaining a well-balanced curable resin composition, the cyanate ester resin (D) is preferably used in an amount of 10 to 1000 parts by mass, more preferably 20 to 500 parts by mass, per 100 parts by mass of the epoxy resin (A), in the curable resin composition of the present invention.

Examples of the latent curing agent used in the invention as component (B) include dibasic acid dihydrazides, such as oxalic, malonic, succinic, glutaric, adipic, suberic, azelaic, sebacic, and phthalic dihydrazide; guanidine compounds, such as dicyandiamide, benzoguanamine, and acetoguanamine; melamine; and modified amines, such as dehydration condensation products between an amine and a carboxylic acid, amine-epoxy adducts, amine-isocyanate adducts, amine-Michael adducts, amine-Mannich reaction products, amine-urea condensates, and amine-ketone condensates.

Preferred of the above-described latent curing agents are the guanidine compounds, such as dicyandiamide, benzoguanamine, and acetoguanamine; and amine-based latent curing agents, such as (B-1) a modified amine obtained by the reaction between an amine compound having one or more active hydrogens and an epoxy compound, (B-2) a modified amine obtained by the reaction between an amine compound having one or more active hydrogens and an isocyanate compound, (B-3) a modified amine obtained by the reaction between an amine compound having one or more active hydrogens, an epoxy compound, and an isocyanate compound, and (B-4) a composition containing at least one modified amine selected from (B-1), (B-2), and (B-3) and a phenol resin.

Examples of the amine compound having one or more active hydrogens include alkylenediamines, such as ethylenediamine, 1,2-diaminopropane, 1,3-diaminopropane, 1,3-diaminobutane, 1,4-diaminobutane, and hexamethylenediamine; polyalkylpolyamines, such as diethylenetriamine, triethylenetriamine, and tetraethylenepentamine; alicyclic polyamines, such as 1,4-diaminocyclohexane, 1,3-diaminocyclohexane, 1,3-diaminomethylcyclohexane, 1,2-diaminocyclohexane, 1,4-diamino-3,6-diethylcyclohexane, 4,4'-diaminodicyclohexylmethane, 1,3-bis(aminomethyl)cyclohexane, 1,4-bis(aminomethyl)cyclohexane, 4,4'-diaminodicyclohexylpropane, bis(4-aminocyclohexyl) sulfone, 4,4'-diaminodicyclohexyl ether, 2,2'-dimethyl-4,4'-diaminodicyclohexylmethane, isophoronediamine, and norbornenediamine; aromatic polyamines, such as m-xylylenediamine, diaminodiphenylmethane, diaminodiphenylsulfone, diethyltoluenediamine, 1-methyl-3,5-diethyl-2,4-diaminobenzene, 1-methyl-3,5-diethyl-2,6-diaminobenzene, 1,3,5-triethyl-2,6-diaminobenzene, 3,3'-diethyl-4,4'-diaminodiphenylmethane, and 3,5,3',5'-tetramethyl-4,4'-diaminodiphenylmethane; guanamines, such as benzoguanamine and acetoguanamine; imidazoles, such as 2-methylimidazole, 2-ethyl-4-methylimidazole, 2-isopropylimidazole, 2-undecylimidazole, 2-heptadecylimidazole, 2-phenylimidazole, 2-phenyl-4-methylimidazole, and 2-aminopropylimidazole; dihydrazides, such as oxalic dihydrazide, malonic dihydrazide, succinic dihydrazide, glutaric dihydrazide, adipic dihydrazide, suberic dihydrazide, azelaic dihydrazide, sebacic dihydrazide, and phthalic dihydrazide; N,N-dimethylaminoethylamine, N,N-diethylaminoethylamine, N,N-diisopropylaminoethylamine, N,N-diallylaminoethylamine, N,N-benzylmethylaminoethylamine, N,N-dibenzylaminoethylamine, N,N-cyclohexylmethylaminoethylamine, N,N-dicyclohexylaminoethylamine, N-(2-aminoethyl)pyrrolidine, N-(2-aminoethyl)piperidine, N-(2-aminoethyl)morpholine, N-(2-aminoethyl)piperazine, N-(2-aminoethyl)-N'-methylpiperazine, N,N-dimethylaminopropylamine, N,N-diethylaminopropylamine, N,N-diisopropylaminopropylamine, N,N-diallylaminopropylamine, N,N-benzylmethylaminopropylamine, N,N-dibenzylaminopropylamine, N,N-cyclohexylmethylaminopropylamine, N,N-dicyclohexylaminopropylamine, N-(3-aminopropyl)pyrrolidine, N-(3-aminopropyl)piperidine, N-(3-aminopropyl)morpholine, N-(3-aminopropyl)piperazine, N-(3-aminopropyl)-N'-methylpiperidine, 4-(N,N-dimethylamino)benzylamine, 4-(N,N-diethylamino)benzylamine, 4-(N,N-diisopropylamino)benzylamine, N,N-dimethylisophoronediamine, N, N-dimethylbis aminocyclohexane, N,N,N'-trimethylethylenediamine, N'-ethyl-N,N-dimethylpropanediamine, N,N,N'-trimethylethylenediamine, N'-ethyl-N,N-dimethylpropanediamine, N'-ethyl-N,N-dibenzylaminopropylamine, N,N-(bisaminopropyl)-N-methylamine, N,N-bisaminopropylethylamine, N,N-bisaminopropylpropylamine, N,N-bisaminopropylbutylamine, N,N-bisaminopropylpentylamine, N,N-bisaminopropylhexylamine, N,N-bisaminopropyl-2-ethylhexylamine, N,N-bisaminopropylcyclohexylamine, N,N-bisaminopropylbenzylamine, N,N-bisaminopropylallylamine, bis[3-(N,N-dimethyglaminopropyl)]amine, bis[3-(N,N-diethylaminopropyl)]amine, bis[3-(N,N-diisopropylaminopropyl)]amine, and bis[3-(N,N-dibutylaminopropyl)]amine Examples of the epoxy compound include polyglycidyl ether compounds of mononuclear polyhydric phenol compounds, such as hydroquinone, resorcin, pyrocatechol, and phloroglucinol; polyglycidyl ether compounds of polynuclear polyhydric phenol compounds, such as dihydroxynaphthalene, biphenol, methylenebisphenol(bisphenol F), methylene bis(orthocresol), ethylidene bisphenol, isopropylidene bisphenol (bisphenol A), isopropylidene bis (orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfonylbisphenol, oxybisphenol, phenol novolak, orthocresol novolak, ethylphenol novolak, butylphenol novolak, octylphenol novolak, resorcin novolak, and terpenephenol; polyglycidyl ether compounds of polyhydric alcohols, such as ethylene glycol, propylene glycol, butylene glycol, hexanediol, polyglycol, thiodiglycol, glycerol, trimethylolpropane, pentaerythritol, sorbitol, and bisphenol A-alkylene oxide adducts; glycidyl esters of aliphatic, aromatic, or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimeric acid, pyromellitic acid, tetrahydrophthalic acid, hexahydrophthalic acid, and endomethylene tetrahydrophthalic acid; homopolymers or copolymers of glycidyl methacrylate; epoxy compounds having a glycidylamino group, such as N,N-diglycidylaniline, bis(4-(N-methyl-N-glycidylamino)phenyl)methane, and diglycidyl orthotoluidine; epoxidized cyclic olefin compounds, such as vinylcyclohexene diepoxide, dicyclopentanediene diepoxide, 3,4-epoxycyclohexylmethyl-3,4-epoxycyclohexane carboxylate, 3,4-epoxy-6-methylcyclohexylmethyl-6-methylcyclohexane carboxylate, and bis(3,4-epoxy-6-methylcyclohexylmethyl) adipate; epoxidized conjugated diene polymers, such as epoxidized polybutadiene and epoxidized styrene-butadiene copolymers; and heterocyclic compounds, such as triglycidyl isocyanurate.

Examples of the isocyanate compound include aromatic diisocyanates, such as 2,4-tolylene diisocyanate, 2,6-tolylene diisocyanate, diphenylmethane-4,4'-diisocyanate, phenylene diisocyanate, xylylene diisocyanate, tetramethylxylylene diisocyanate, 1,5-naphthylene diisocyanate, 1,5-tetrahydronaphthylene diisocyanate, 3,3'-dimethyldiphenyl-4,4'-diisocyanate, dianisidine diisocyanate, and tetramethylxylylene diisocyanate; alicyclic diisocyanates, such as isophorone diisocyanate, dicyclohexylmethane-4,4'-diisocyanate, trans-1,4-cyclohexyl diisocyanate, and norbornene diisocyanate; aliphatic diisocyanates, such as tetramethylene diisocyanate, 1,6-hexamethylene diisocyanate, 2,2,4- and/or 2,4,4-trimethylhexamethylene diisocyanate, and lysine diisocyanate; isocyanurate trimers, biuret trimers, or trimethylolpropane adducts of the above recited diisocyanates; triphenylmethane triisocyanate, 1-methylbenzole-2,4,6-triisocyanate, and dimethyltriphenylmethane tetraisocyanate. These isocyanate compounds may be used in a modified form, such as carbodiimide-, isocyanurate- or biuret-modified, or in a blocked form blocked with any of various blocking agents.

The ratio of the epoxy compound to the amine compound having one or more active hydrogens in the modified amine (B-1) is preferably such that the epoxy equivalent of the epoxy compound is 0.1 to 1.1, more particularly 0.2 to 0.9, per active hydrogen equivalent of the amine compound.

The ratio of the isocyanate compound to the amine compound having one or more active hydrogens in the modified amine (B-2) is preferably such that the isocyanate equivalent of the isocyanate compound is 0.1 to 1.1, more preferably 0.2 to 0.9, per active hydrogen equivalent of the amine compound.

The ratio of the epoxy compound and the isocyanate compound to the amine compound having one or more active hydrogens in the modified amine (B-3) is preferably such that the total of the epoxy equivalent of the epoxy compound and the isocyanate equivalent of the isocyanate compound is 0.1 to 1.1, more preferably 0.2 to 0.9, per active hydrogen equivalent of the amine compound.

If the ratio of the epoxy compound and/or the isocyanate compound to the amine compound having one or more active hydrogens is less than the recited lower limit, the composition may have reduced storage stability. If the ratio exceeds the recited upper limit, the curing properties of the composition can be reduced.

These modified amines preferably contain active hydrogen, and use of such a modified amine is particularly advantageous in terms of excellent curing properties and excellent physical properties of a cured product. In other words, the latent curing agent (B) for use in the invention is preferably the active hydrogen-containing amine-based latent curing agent.

The methods for preparing the modified amines (B-1), (B-2), and (B-3) are not particularly limited. For example, they can be prepared by allowing the amine compound having one or more active hydrogens to react with the epoxy compound and/or the isocyanate compound in the absence or, if necessary, presence of a solvent, under heating at a temperature within a range from room temperature to 140° C. for 1 to 10 hours. In the preparation of the modified amine (B-3), it is preferred that the reaction between the amine compound and the epoxy compound precede the reaction with the polyisocyanate compound. When a solvent is used, the solvent may be removed after the reaction by heating under atmospheric pressure or reduced pressure. The reaction product which is solid may be pulverized using an apparatus such as a jet mill.

Examples of the solvent used in the preparation of the modified amines include ketones, such as methyl ethyl ketone, methyl amyl ketone, diethyl ketone, acetone, methyl isopropyl ketone, propylene glycol monomethyl ether acetate, and cyclohexane; ethers, such as tetrahydrofuran, 1,2-dimethoxyethane, 1,2-diethoxyethane, and propylene glycol monomethyl ether; esters, such as ethyl acetate and n-butyl acetate; aromatic hydrocarbons, such as benzene, toluene, and xylene; halogenated aliphatic hydrocarbons, such as carbon tetrachloride, chloroform, trichloroethylene, and methylene chloride; and halogenated aromatic hydrocarbons, such as chlorobenzene.

Examples of the phenol resin used in the component (B-4) include polyhydric phenol compounds, such as phenol novolak resins, cresol novolak resins, aromatic hydrocarbon formaldehyde resin-modified phenol resins, dicyclopentadiene-phenol adduct resins, phenol aralkyl resins (Xyloc resins), naphthol aralkyl resins, trisphenylolmethane resins, tetraphenylolethane resins, naphthol novolak resins, naphthol-phenol cocondensate novolak resins, naphthol-cresol cocondensate novolak resins, biphenyl-modified phenol resins (polyhydric phenol compounds having phenol nuclei linked by bismethylene), biphenyl-modified naphthol resins (polyhydric naphthol compounds having phenol nuclei linked by bismethylene), aminotriazine-modified phenol resins (compounds having a phenol structure, a triazine ring, and a primary amino group in the molecule), and alkoxy-containing aromatic ring-modified novolak resins (polyhydric phenol compounds having a phenol nucleus and an alkoxy-containing aromatic ring linked by formaldehyde).

The phenol resin used in the component (B-4) preferably has a number average molecular weight of 750 to 1200 in view of good balance between storage stability and curing properties.

The amount of the phenol resin used in the component (B-4) is preferably 10 to 100 parts by mass, more preferably 20 to 60 parts by mass, per 100 parts by mass of the total amount of the modified amines as components (B-1), (B-2), and (B-3). With less than 10 parts of the phenol resin, sufficient curing properties may not be obtained. With more than 100 parts of the phenol resin, the resulting cured product may have reduced physical properties.

Commercially available latent curing agents include ADEKA Hardener series EH-3636AS (dicyandiamide type), EH-4351S (dicyandiamide type), EH-5011S (imidazole type), EH-5046S (imidazole type), EH-4357S (polyamine type), EH-4358S (polyamine type), EH-5057P (polyamine type), and EH-5057PK (polyamine type), all available from Adeka Corp.; Amicure PN-23 (amine adduct type), Amicure PN-40 (amine adduct type), and Amicure VDH (hydrazide type), all available from Ajinomoto Finetechno Co., Ltd.; and Fujicure FXR-1020, available from T&K TOKA Co., Ltd.

The content of the latent curing agent (B) in the curable resin composition is not particularly limited but is preferably in the range of from 1 to 200 parts by mass, more preferably 3 to 150 parts by mass, per 100 parts by mass of the epoxy resin (A). With less than 1 part by mass of the curing agent, curing reaction does not proceed. With more than 200 parts of the curing agent, the resulting cured product can have reduced physical properties.

If necessary, the curable resin composition of the invention may further contain a known curing accelerator in addition to the latent curing agent (B). Specific examples of the curing accelerator include phosphines, such as triphenylphosphine; phosphonium salts, such as tetraphenylphosphonium bromide; imidazoles, such as 2-methylimidazole, 2-phenylimidazole, 2-ethyl-4-methylimidazole, 2-undecylimidazole, and 1-cyanoethyl-2-methylimidazole; imidazole salts between the imidazole compound recited above and trimellitic acid, isocyanuric acid, boron, etc.; amines, such as benzyldimethylamine and 2,4,6-tris(dimethylaminomethyl)phenol; quaternary ammonium salts, such as trimethylammonium chloride; ureas, such as 3-(p-chlorophenyl)-1,1-dimethylurea, 3-(3,4-dichlorophenyl)-1,1-dimethylurea, 3-phenyl-1,1-dimethylurea, isophorone diisocyanate-dimethylurea, and tolylene diisocyanate-dimethylurea; and complex compounds between boron trifluoride and an amines, an ether compound, or the like. The curing accelerators may be used either individually or in combination thereof. The curing accelerator content in the curable resin composition is decided as appropriate.

The compound of formula (1) used in the invention as component (C) will then be described.

[Chem. 5]

(1)

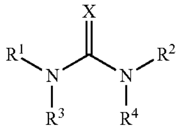

wherein X represents an oxygen atom or a sulfur atom; $R^1$ and $R^2$ each independently represent a hydrogen atom, an alkyl group, or an aryl group; and $R^3$ and $R^4$ each independently represent a hydrogen atom, an alkyl group, or an aryl group, or $R^3$ and $R^4$ are connected to each other to represent a divalent group to form a ring.

The compound of formula (1) is a urea or thiourea compound with a specific structure. Adding such a specific compound to a curable resin composition containing a curing resin, such as an epoxy resin, reduces or controls shrinkage of the curable resin composition on curing.

Examples of the alkyl group represented by $R^1$, $R^2$, $R^3$, and $R^4$ in formula (1) include methyl, ethyl, propyl, isopropyl, butyl, isobutyl, sec-butyl, tert-butyl, amyl, isoamyl, sec-amyl, tert-amyl, hexyl, heptyl, octyl, isooctyl, 2-ethylhexyl, nonyl, isononyl, decyl, cyclohexyl, benzyl, phenethyl, and allyl. Examples of the aryl group represented by $R^1$, $R^2$, $R^3$, and $R^4$ include phenyl, naphthyl, anthraceranyl, and phenanthrenyl. The aryl group may be substituted with the above-recited alkyl or aryl group.

Examples of the divalent group to form a ring, the divalent group represented by $R^3$ and $R^4$ connected to each other, include methylene, ethylene, propylene, butylene, pentylene, hexylene, heptylene, octylene, nonylene, decylene, cyclohexylene, phenylene, naphthylene, phenanthrene, and anthracenylene. The ring including the divalent group may be a hetero ring containing oxygen, sulfur, or nitrogen, for example. The hydrogen atom of the ring-forming group may be replaced with the above-recited alkyl or aryl group, a halogen atom (e.g., F, Cl, or Br), a haloalkyl group (e.g., fluoromethyl or chloromethyl), or a nitrile group.

Specific examples of the compound of formula (1) are shown below.

[Chem. 6]

U-1

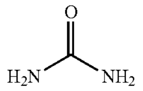

U-2

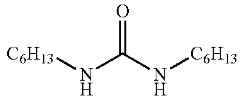

U-3

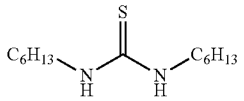

U-4

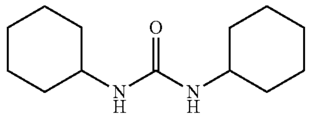

U-5

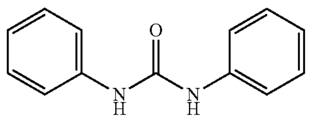

U-6

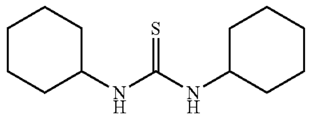

U-7

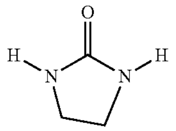

U-8

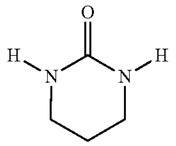

U-9

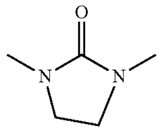

U-10

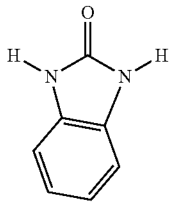

-continued

U-11

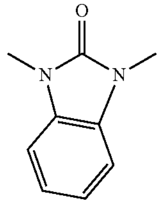

U-12

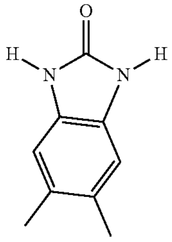

U-13

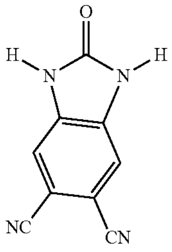

U-14

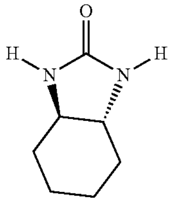

Preferred of the above examples of component (C) are U-1, U-4, U-5, U-6, U-10, U-12, and U-13 for their high reducing or controlling effects on shrinkage on curing.

The amount of component (C) used is preferably 0.1 to 10 parts by mass, more preferably 0.5 to 5 parts by mass, per 100 parts by mass of the total amount of components (A), (B), and (C). With less than 0.1 parts of component (C), sufficient reducing or controlling effects on shrinkage on cuing are not exhibited. Use of more than 10 parts of component (C) can adversely affect the physical properties of the resulting cured product.

Where needed, the curable resin composition of the invention may contain various additives. Examples of the additives include phenol compounds, such as biphenol; reactive diluents, such as monoalkyl glycidyl ethers; non-reactive diluents (plasticizers), such as dioctyl phthalate, dibutyl phthalate, benzyl alcohol, and coal tar; silica, including fused silica and crystalline silica; fillers, such as powders or spherized beads of magnesium hydroxide, aluminum hydroxide, zinc molybdate, calcium carbonate, silicon carbonate, calcium silicate, potassium titanate, beryllia, zirconia, zircon, forsterite, steatite, spinel, mullite, titania, and so forth, glass fiber, pulp fiber, synthetic fiber, and ceramic fiber; reinforcing materials, such as glass cloth, aramid cloth, and carbon fiber; pigments; silane coupling agents, such as γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, γ-glycidoxypropyltriethoxysilane, β-(3,4-epoxycyclohexyl)ethyltriethoxysilane, vinyltriethoxysilane, N-β-(N-vinylbenzylaminoethyl)-γ-aminopropyltriethoxysilane, γ-methacryloxypropyltrimethoxysilane, γ-chloropropyltrimethoxysilane, and γ-mercaptopropyltrimethoxysilane; lubricants, such as candelilla wax, carnauba wax, Japan tallow, Chinese insect wax, bees wax, lanolin, spermaceti, montan wax, petroleum wax, aliphatic waxes, aliphatic esters, aliphatic ethers, aromatic esters, and aromatic ethers; thickeners; thixotropic agents; antioxidants; light stabilizers; UV absorbers; anti-foaming agents; rust inhibitors; colloidal silica, colloidal alumina; and other additives commonly used. Tacky resins, such as xylene resins and petroleum resins, may be used in combination.

The curable resin composition of the invention is useful in wide variety of applications, including coatings or adhesives for concrete, cement mortar, various metals, leather, glass, rubber, plastics, wood, cloth, paper, and so forth. It is especially suited for use as adhesives because of its high reducing or controlling effects on shrinkage on curing.

The invention provides a method for reducing or controlling shrinkage, on curing, of a curable resin composition containing a curing resin component containing (A) an epoxy resin with or without (D) a cyanate ester resin and (B) a latent curing agent by incorporating to the resin composition (C) a compound of formula (1). The method for preparing the curable resin composition from these components is not particularly restricted. For example, component (C) may be added to component (A) or (B) before mixing components (A) and (B).

EXAMPLES

The invention will now be illustrated in greater detail with reference to Examples and Comparative Example, but it should be understood that the invention is not deemed to be limited thereto. Unless otherwise noted, all the parts and percentages hereinafter given are by mass.

Preparation Example 1—Synthesis of Amine-Based Latent Curing Agent

In a flask was placed 230 g of Jeffermine D230 (product name polyether polyamine from Huntsman Corp.) and heated to 60° C. To the flask was added 190 g of Adeka Resin EP-4901E (bisphenol F epoxy resin from Adeka Corp.; epoxy equiv.: 170) in small portions so that the system temperature might be kept between 100° and 110° C. After completion of the addition, the reaction system temperature was elevated to 140° C., at which the reaction was continued for 1.5 hours to give a modified polyamine.

To 100 g of the resulting modified polyamine was added 50 g of MP-800K (phenol resin from Asahi Yukizai Corp.; softening point: 100° C.). The solvent was removed at 180° to 190° C. and 30 to 40 torr over a period of 1 hour, and the residual solid was pulverized in a jet mill to make an amine-based latent curing agent, designated EH-1.

Examples 1 to 6 and Comparative Example 1

EP-4100L (bisphenol A epoxy resin from Adeka Corp.) as component (A), the amine-based latent curing agent EH-1 as component (B), and LECY (bisphenol cyanate ester resin from Lonza) as component (D) were mixed together in a mass ratio of 1:1:1 to prepare a curable resin composition containing no component (C), which was used as the curable resin composition of Comparative Example 1.

Three parts of component (C) shown in Table 1 below was added to 100 parts of the curable resin composition of Comparative Example 1 to obtain curable resin compositions of Examples 1 to 6.

Two point one parts of component (C) shown in Table 2 was added to 100 parts of the curable resin composition of Comparative Example 1 to obtain a curable resin composition of Example 7.

Shrinkage on Curing:

Measurement was carried out using an automatic pycnometer AccuPyc 1330 (from Shimadz Corp.) at an indicated temperature of 23 to 26° C. The amount of the measurement sample was one gram. On the day of measurement, calibration was performed by measuring the density of a standard sphere to check that the reading was within ±0.002 of the known density, and then measurements for the samples were carried out. Twenty measurements for determining the density were taken per sample, and the average thereof was calculated and used as the density. A shrinkage was calculated from the densities before and after curing according to the following formula. The curing of the curable resin composition was conducted by heating at 100° C. for 1 hour. The results of evaluation are shown in Tables 1 and 2.

$$\text{Shrinkage (\%)}=[1-(\text{density after cure})/(\text{density before cure})]\times 100$$

TABLE 1

| | Example | | | | | | Comparative |
|---|---|---|---|---|---|---|---|
| | 1 | 2 | 3 | 4 | 5 | 6 | Example 1 |
| Component (C) | U-1 | U-4 | U-6 | U-10 | U-12 | U-13 | — |
| Shrinkage on Curing (%) | −2.0 | −2.2 | −1.9 | −0.2 | −2.2 | −1.2 | −3.0 |

TABLE 2

| | Example 7 |
|---|---|
| Component (C) | U-14 |
| Shrinkage on Curing (%) | −1.4 |

As demonstrated in Examples, the curable resin composition of the invention is excellent in reduction or control of shrinkage on curing.

INDUSTRIAL APPLICABILITY

The invention provides a curable resin composition exhibiting reduced or controlled shrinkage on curing, and the curable resin composition is suited for use as, for example, an adhesive for precision parts.

The invention claimed is:

1. A curable resin composition comprising: (A) an epoxy resin, (B) a latent curing agent, (C) at least one compound selected from U-1, U-4, U-5, U-6, U-10, U-12, and U-13 shown below:

U-1

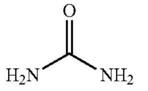

U-4

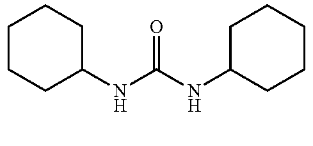

-continued

U-5

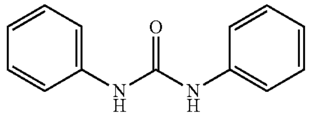

U-6

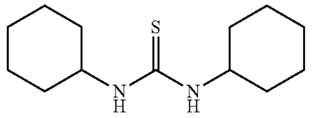

U-10

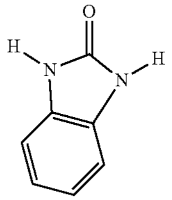

U-12

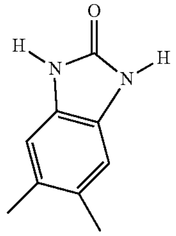

U-13

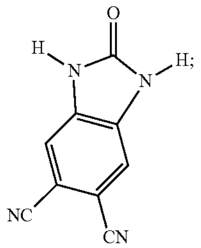

and (D) a cyanate ester resin.

2. The curable resin composition according to claim 1, wherein the cyanate ester resin (D) comprises at least one member selected from the group consisting of a compound represented by formula (2):

$$NC—O-A^1-Y^1-A^2-O—CN \qquad (2)$$

wherein $Y^1$ represents an unsubstituted or fluorine-substituted divalent hydrocarbon group, —O—, —S—, or a single bond; and $A^1$ and $A^2$ each independently represent an unsubstituted phenylene group or a phenylene group substituted with an alkyl group having 1 to 4 carbon atoms;

a compound represented by formula (3):

(3)

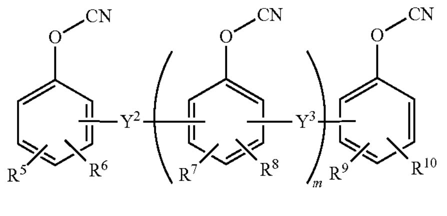

wherein m represents an integer of 1 or greater; $Y^2$ and $Y^3$ each independently represent an unsubstituted or fluorine-substituted divalent hydrocarbon group; and $R^5$, $R^6$, $R^7$, $R^8$, $R^9$, and $R^{10}$ each independently represent a hydrogen atom or an alkyl group having 1 to 4 carbon atoms; and a polymer thereof.

3. The curable resin composition according to claim 2, wherein $Y^1$ in formula (2) and $Y^2$ and $Y^3$ in formula (3) each comprises at least one structure represented by any one of the following formulae (Y-1) through (Y-9):

(Y-1)

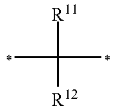

(Y-2)

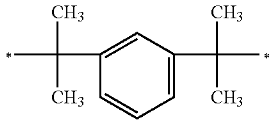

(Y-3)

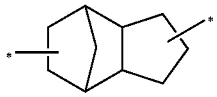

(Y-4)

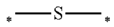

(Y-5)

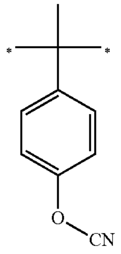

(Y-6)

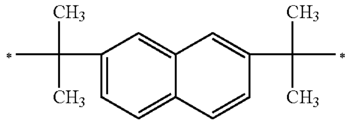

(Y-7)

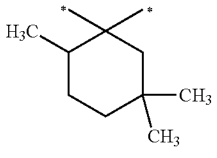

(Y-8)

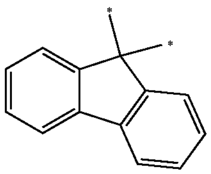

(Y-9)

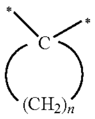

wherein n represents an integer of 4 to 12; $R^{11}$ and $R^{12}$ each independently represent a hydrogen atom or an unsubstituted or fluorine-substituted methyl group; and an asterisk indicates a bond.

4. The curable resin composition according to claim 2, wherein the latent curing agent (B) is an active hydrogen-containing amine-based latent curing agent.

5. The curable resin composition according to claim 3, wherein the latent curing agent (B) is an active hydrogen-containing amine-based latent curing agent.

6. The curable resin composition according to claim 1, wherein the latent curing agent (B) is an active hydrogen-containing amine-based latent curing agent.

7. The curable resin composition according to claim 6, wherein the active hydrogen-containing amine-based latent curing agent comprises at least one guanidine compound.

8. The curable resin composition according to claim 6, wherein the active hydrogen-containing amine-based latent curing agent comprises at least one member selected from (B-1) a modified amine obtained by the reaction between an amine compound having one or more active hydrogens and an epoxy compound, (B-2) a modified amine obtained by the reaction between an amine compound having one or more active hydrogens and an isocyanate compound, (B-3) a modified amine obtained by the reaction between an amine compound having one or more active hydrogens, an epoxy compound, and an isocyanate compound, and (B-4) a composition comprising at least one modified amine selected from (B-1), (B-2), and (B-3) and a phenol resin.

9. The curable resin composition according to claim 1, wherein the cyanate ester resin (D) is present in an amount of 10 to 1000 parts by mass per 100 parts by mass of the epoxy resin (A).

10. The curable resin composition according to claim 1, wherein the latent curing agent (B) is present in an amount of 1 to 100 parts by mass per 100 parts by mass of the epoxy resin (A).

11. The curable resin composition according to claim 1, wherein the compound (C) is present in an amount of 0.5 to 20 parts by mass per 100 parts by mass of the total amount of the epoxy resin (A) and the latent curing agent (B).

12. A cured product obtained from the curable resin composition according to claim 1.

13. A method for reducing or controlling shrinkage of a cured product obtained from a curable resin composition comprising (A) an epoxy resin and (B) a latent curing agent, the method comprising curing the resin composition in the presence of (C) at least one compound selected from U-1, U-4, U-5, U-6, U-10, U-12, and U-13 shown below:

U-1

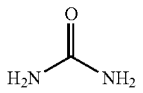

U-4

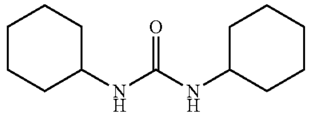

-continued
U-5
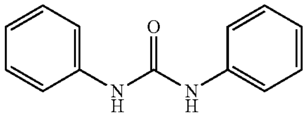
U-6
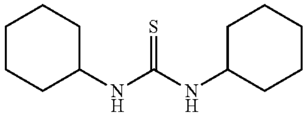
U-10
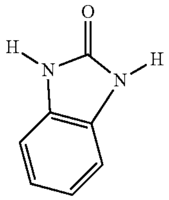
-continued
U-12
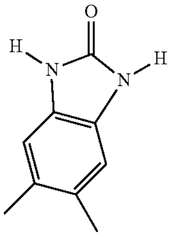
U-13
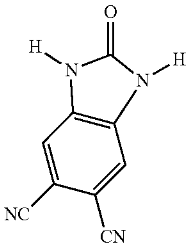
wherein the curable resin composition further comprises (D) a cyanate ester resin.
* * * * *